United States Patent
Reimann (10) Patent No.: US 9,702,742 B2
(45) Date of Patent: Jul. 11, 2017

(54) CIRCUIT ASSEMBLY AND METHOD FOR PLAUSIBILITY CHECKING OF SENSOR SIGNALS

(75) Inventor: Mathias Reimann, Stuttgart-Sued (DE)

(73) Assignee: Robert Bosch GmbH, Stuttgart (DE)

( * ) Notice: Subject to any disclaimer, the term of this patent is extended or adjusted under 35 U.S.C. 154(b) by 692 days.

(21) Appl. No.: 14/236,931

(22) PCT Filed: Jun. 11, 2012

(86) PCT No.: PCT/EP2012/061013
§ 371 (c)(1),
(2), (4) Date: May 27, 2014

(87) PCT Pub. No.: WO2013/020739
PCT Pub. Date: Feb. 14, 2013

(65) Prior Publication Data
US 2014/0318209 A1    Oct. 30, 2014

(30) Foreign Application Priority Data

Aug. 5, 2011 (DE) .................. 10 2011 080 511

(51) Int. Cl.
*G06F 11/30* (2006.01)
*G01D 21/00* (2006.01)
*B60R 21/01* (2006.01)

(52) U.S. Cl.
CPC ............. *G01D 21/00* (2013.01); *B60R 21/01* (2013.01); *B60R 2021/0119* (2013.01); *B60R 2021/01047* (2013.01)

(58) Field of Classification Search
CPC ........ B60R 21/013; B60R 2021/01286; B60R 2021/01027; B60R 2021/0119; B60R 21/01; B60R 2021/01047; G01D 21/00
(Continued)

(56) References Cited

U.S. PATENT DOCUMENTS 7,137,645 B2 * 11/2006 Schumacher ......... B60R 21/013
                                                        180/282
2004/0094349 A1    5/2004 Schumacher et al.
2007/0055429 A1    3/2007 Komaki et al.

FOREIGN PATENT DOCUMENTS

DE    44 25 846 A1    1/1996
DE    198 25 817 C1    9/1999
(Continued)

OTHER PUBLICATIONS

International Search Report corresponding to PCT Application No. PCT/EP2012/061013, mailed Oct. 12, 2012 (German and English language document) (7 pages).

*Primary Examiner* — An Do
(74) *Attorney, Agent, or Firm* — Maginot, Moore & Beck LLP (57) ABSTRACT

A circuit assembly for plausibility checking of sensor signals, which can be generated by at least two separate sensor elements, includes at least one evaluation and control unit which receives the sensor signals via at least one interface unit and evaluates the received sensor signals for generating sensor data. A first evaluation and control unit is configured to receive the sensor signals of a first sensor element and to generate first sensor data from the first sensor signals. The first evaluation and control unit is configured to provide the generated first sensor data via at least one interface unit to a second evaluation and control unit, which receives and evaluates the sensor signals of a second sensor element to generate second sensor data. The second evaluation and control unit compares the generated second sensor data and the generated first sensor data to each other and inspects them for plausibility.

5 Claims, 4 Drawing Sheets

(58) Field of Classification Search
USPC .......................................... 702/127, 182, 183
See application file for complete search history.

(56) References Cited

FOREIGN PATENT DOCUMENTS

| | | |
|---|---|---|
| DE | 100 57 916 A1 | 5/2002 |
| DE | 10 2004 056 415 A1 | 5/2006 |
| DE | 10 2007 019 432 A1 | 10/2008 |
| DE | 10 2007 058 071 A1 | 6/2009 |
| DE | 10 2007 059 414 A1 | 6/2009 |
| JP | 2012-77986 A | 4/2012 |
| WO | 2006/076989 A1 | 7/2006 |

* cited by examiner

CIRCUIT ASSEMBLY AND METHOD FOR PLAUSIBILITY CHECKING OF SENSOR SIGNALS

This application is a 35 U.S.C. §371 National Stage Application of PCT/EP2012/061013, filed on Jun. 11, 2012, which claims the benefit of priority to Serial No. DE 10 2011 080 511.7, filed on Aug. 5, 2011 in Germany, the disclosures of which are incorporated herein by reference in their entirety.

BACKGROUND

The disclosure is based on a circuit assembly for plausibility checking of sensor signals, and on a method for plausibility checking of sensor signals.

Circuit assemblies for plausibility checking of sensor signals, known from the prior art, comprise, as a rule, two identical sensor units, the sensor signals of which are monitored for redundancy by an evaluating and control unit. For this purpose, the two sensor units and the evaluating and control unit are installed on one circuit board in a device unit. The sensor signals of the two sensor units are read out cyclically and compared with one another by the evaluating and control unit. If the difference of the two signals exceeds a defined threshold value, the signal output is marked as invalid.

In circuit assemblies for plausibility checking of sensor signals, the connection between a sensor unit or circuit board and a connecting cable is usually implemented by soldering or by welding the strands of the connecting cable to contact tabs which are mounted on the circuit board. Sealing of the connecting cable can be implemented, for example, by overmolding and/or by molding.

In Offenlegungsschrift DE 10 2004 056 415 A1, an integrated circuit with a housing is described. The integrated circuit is located in a control unit and provides an output variable which is monitored by an evaluating unit. Furthermore, the integrated circuit comprises an interface which connects the control unit to at least one sensor unit arranged outside the control unit. By means of the integrated circuit, various functions can be performed in a chip.

In offenlegungsschrift DE 10 2007 058 071 A1, a method and a device for plausibility checking an evaluation of safety-related signals for a motor vehicle are described. The device for plausibility checking described comprises at least one evaluating and control unit which evaluates the safety-related signals. In this context, another evaluating and control unit than that used for the evaluation of the safety-related signals is provided for at least one of the plausibility check calculations. By transferring the plausibility check calculations into another evaluating and control unit, a more advantageous resource distribution can be achieved.

SUMMARY

The circuit assembly for plausibility checking of sensor signals according to the disclosure and the method for plausibility checking of sensor signals according to the disclosure, have the advantage, by comparison, that a first evaluating and control unit receives the sensor signals of a first sensor element and evaluates them for generating first sensor data and provides the generated first sensor data via at least one interface unit to a second evaluating and control unit which receives the sensor signals of a second sensor element and evaluates them for generating second sensor data, wherein the second evaluating and control unit compares the generated second sensor data and the generated first sensor data with one another and checks them for plausibility. In this context, the first sensor element and the first evaluating and control unit preferably form a first sensor unit and the second sensor element and the second evaluating and control unit preferably form a second sensor unit.

By means of the evaluating and control units which are integrated into the respective sensor unit, embodiments of the present disclosure advantageously provide for a smarter architecture and design of the circuit assembly. As a result, more cost effective products can be developed and implemented. In addition, external evaluating and control units and associated communication links can be saved. Since the sensor signals of a sensor element are evaluated by their own integrated evaluating and control unit and converted into sensor data, transmission errors due to faulty communication links can be advantageously avoided. Furthermore, a flexible distribution of resources is possible since the plausibility check calculations can be performed in an existing second evaluating and control unit, integrated in the second sensor unit, which can have a higher computing power than the first evaluating and control unit integrated in the first sensor unit. Thus, a more elaborate and more accurate method for plausibility checking of the sensor signals is advantageously possible.

A circuit assembly according to the disclosure for plausibility checking of sensor signals, especially of safety-related signals in a motor vehicle, comprises a first evaluating and control unit which receives sensor signals of a first sensor element and evaluates them for generating first sensor data and provides the generated first sensor data via at least one interface unit to a second evaluating and control unit which receives the sensor signals of a second sensor element and evaluates them for generating second sensor data, wherein the second evaluating and control unit compares the generated second sensor data and the generated first sensor data with one another and checks them for plausibility.

A method according to the disclosure for the plausibility checking of sensor signals, especially of safety-related signals in a motor vehicle, performs the evaluation and conversion into first sensor data of the first sensor signals acquired by a first sensor element by means of a first evaluating and control unit and transmits the first sensor data to a second evaluating and control unit which evaluates the sensor signals of a second sensor element and converts them into second sensor data. Furthermore, the first sensor data generated and the second sensor data generated are compared with one another by the second evaluating and control unit and checked for plausibility.

In the present text, the evaluating and control unit can be understood to be an electrical device such as, for example, a control device which processes and evaluates sensor signals acquired. The evaluating and control unit can have at least one interface unit which can be designed as hardware and/or software. In the case of a hardware design, the interface units can be, for example, part of a so-called system ASIC which contains the most varied functions of the evaluating and control unit. However, it is also possible that the interface units are independent integrated circuits or consist at least partly of discrete components. In the case of a software design, the interface units can be software modules which, for example, are present on a microcontroller, apart from other software modules. A computer program product with programming code which is stored on a machine-readable medium such as a semiconductor memory, a hard disk memory or an optical memory and is used for performing the evaluation when the program is executed by the evaluating and control unit is also advantageous.

In the present text, a sensor unit is understood to be a constructional unit which comprises at least one sensor element which detects a physical quantity or a change of a physical quantity directly or indirectly and converts it preferably into an electrical sensor signal. This can be effected, for example, by sending out and/or receiving sound and/or electromagnetic waves and/or via a magnetic field or, respectively, the changing of a magnetic field and/or the receiving of satellite signals, for example of a GPS signal.

Optical sensor elements are possible which, for example, have a photoplate and/or a fluorescent surface and/or a semiconductor which detect the impingement or the intensity, the wavelength, the frequency, the angle etc. of the received wave such as, for example, infrared sensor elements. An acoustic sensor element is also conceivable such as, for example, an ultrasonic sensor element and/or a radio-frequency sensor element and/or a radar sensor element and/or a sensor element which responds to a magnetic field such as, for example, a Hall sensor element and/or a magnetoresistive sensor element and/or an inductive sensor element which registers the change in a magnetic field, for example via the voltage produced by magnetic induction. The sensor signals can be determined statically and/or dynamically. Furthermore, the sensor signals can be determined continuously or singularly.

The sensor signals determined are evaluated by the evaluating and control unit integrated in the sensor unit and converted into sensor data which comprises a physical quantity determined from a physical quantity detected by means of the respective sensor unit, with the associated unit. In this context, the change in travel within a particular time window is determined, for example, by a sensor element and from this a speed and/or acceleration is calculated by the evaluating and control unit. Further calculatable physical quantities are mass, number of revolutions, force, energy and/or other conceivable quantities such as, for example, a probability of a particular event occurring.

Plausibility checking or plausibility control is understood to be a method within the context of which a result or a value of a physical quantity determined is checked to see whether it is acceptable and/or obvious and/or reproducible and/or plausible.

By means of the measures according to the disclosure, advantageous improvements of the circuit assembly for plausibility checking of sensor signals and of the method for plausibility checking of sensor signals are possible.

It is particularly advantageous that the second evaluating and control unit outputs in dependence on the result of the comparison validated sensor data, which correspond to the first or the second sensor data, and/or at least one control signal and/or at least one plausibility check signal. In this manner, it is advantageously ensured that exclusively plausible sensor data are output for further processing and/or for triggering a function. If the sensor data are not plausible, they will not be output or identified as non-plausible sensor data. This can be implemented, for example, by the additional output of a negative plausibility check signal. Plausible sensor data can be identified, for example, by the additional output of a positive plausibility check signal. Since the first sensor data are conveyed to the second evaluating and control unit, the second evaluating and control unit can advantageously output the first and/or the second sensor data in the case of proven plausibility. This is appropriate especially when the sensor data are determined in different value ranges. By this means, more accurate sensor data and/or sensor data which assume less storage space, for example, can advantageously be forwarded. The control signal can be an additional safeguard and/or feedback. In this manner, it can be advantageously ensured that both evaluating and control units and both sensor elements, and also the communication links between the evaluating and control units, operate correctly.

In an advantageous embodiment of the circuit assembly according to the disclosure, a first control signal comprises in the case of a first comparison result which represents a constant plausibility of the first and second sensor data a confirmation signal and/or an output command. The first control signal is output to the first evaluating and control unit. Additionally or as an alternative, the positive plausibility check signal can be output for further processing to a higher-level or subsequent process. In this manner, errors in the signal processing of the first and/or the second sensor unit can be advantageously determined and/or reported to a higher-level or subsequent process. By the confirmation signal, the first sensor unit is advantageously informed that the sensor data determined are plausible and/or the sensor data determined have been output by the second sensor unit and/or the signal processing has occurred correctly. If this confirmation signal is lacking, further measures can be advantageously taken in order to eliminate errors which have occurred. The confirmation signal can be advantageously at the same time an output command to the first evaluating and control unit so that the first evaluating and control unit outputs its validated sensor data determined. By this means, the circuit assembly can be used even more flexibly.

In an advantageous embodiment of the circuit assembly according to the disclosure, a second control signal comprises in the case of a second comparison result which represents a lacking plausibility of the first and second sensor data an error signal and/or a reset signal and is output to the first evaluating and control unit in order to effect resetting of the first sensor unit and/or a new measurement of the first sensor signals. By means of such a reset process of the first sensor unit, the first evaluating and control unit, designed, for example, as microprocessor, and the first sensor element can be reset to an initial state and/or the first sensor data stored in registers or memories can be deleted and/or a program or method sequence can be reset to a starting step. In addition or as an alternative, an output signal identified as implausible can be output for further processing to a higher-level or subsequent process, which signal comprises the first and/or second sensor data and/or the negative plausibility check signal. In this manner, errors in the signal processing of the first sensor unit and/or a higher-level or subsequent process can be reported advantageously. A possible error is, for example, the lack of a transmission of the first sensor data to the second evaluating and control unit. The cause of this can be a faulty communication link and/or a wrongly set first sensor element and/or a defective first sensor element wherein, in the case of a malfunction of the first sensor element, no first sensor signals and/or faulty first sensor signals are determined. A further reason for the nonexistent plausibility of the first and second sensor data can be a lack of correspondence of the first and second sensor data. This can be caused by a defective first and/or second evaluating and control unit which do not process the received first and second sensor signals correctly and/or by a defective first and/or second sensor element.

By means of a corresponding error signal of the second evaluating and control unit, the first sensor unit can be advantageously alerted about such errors. Furthermore, sending out faulty sensor data can be advantageously prevented and a fault elimination and/or resetting of the sensor elements and/or new measurement of the sensor signals can be started.

In a further advantageous embodiment of the circuit assembly according to the disclosure for plausibility checking of sensor signals, the first evaluating and control unit outputs in response to the error signal or to the lack of the confirmation signal and/or the lack of the output command a third control signal to the second evaluating and control unit which causes a resetting of the second sensor unit and/or a new measurement of the second sensor signals. By means of such a reset process of the second sensor unit, the second evaluating and control unit, designed for example as microprocessor, and the second sensor element can be reset into a starting state and/or the second sensor data stored in registers or memories can be deleted and/or a program or method sequence can be reset to a starting step. In this manner, the two sensor units can be advantageously brought into the same state and a new measuring process can be started in both sensor units.

In a further advantageous embodiment of the circuit assembly according to the disclosure, the first and second sensor data can be compared with one another directly and/or after processing, especially by a factor, by means of calculation of a difference and/or a quotient, wherein the first and second sensor data are plausible if the result of the comparison is in at least a predetermined range and wherein the first and second sensor data are not plausible if the result of the comparison is outside the at least one predetermined range. In this manner, various ranges can be specified advantageously. For example, a narrower range in which the result of the comparison points to a high plausibility, i.e. the quotient determined is almost one or the determined difference is almost zero etc., and a greater range can be determined for which it holds true that the sensor data determined are less plausible and/or less accurate or unambiguous. If the sensor data compared point, for example, to a possible accident situation and are plausible within the narrower range, non-reversible safety functions such as, for example, an airbag etc. can be activated. If the sensor data are, for example, plausible within the wider range, reversible safety systems can be triggered such as, for example, a belt tightener etc.

In a further advantageous embodiment of the circuit assembly according to the disclosure for plausibility checking of sensor signals, the first and the second sensor unit acquire and evaluate equal physical quantities in the same or in different value ranges or different physical quantities. For example, the first and the second sensor unit can have identical sensor elements which acquire the same physical quantity in each case in the same value range, one sensor unit advantageously rounding more accurately. In this manner, the more complex rounding calculation can be executed only once. Furthermore, the first and the second sensor unit can have sensor elements which acquire the same physical quantity in different value ranges. Thus, the first sensor unit, for example, acquires an acceleration in the low-G range and the second sensor unit acquires, for example, an acceleration in the high-G range. Furthermore, different physical quantities can be acquired via different sensor elements, the same physical quantity being determined as sensor data from the acquired different physical quantities in each sensor unit. For example, a path traveled can be calculated via a GPS signal, via the rotational speed of the wheels and/or from the speed of the vehicle. Thus, many sensor units already present can be used advantageously for checking plausibility. Furthermore, equal physical quantities can be acquired advantageously at different locations such as, for example, acting forces, yawing rates, etc. A possible redundancy monitoring is possible by recalculations; thus, from a determined speed and a determined acceleration, the corresponding kinetic energy or energy of acceleration can be calculated and this can be checked for redundancy.

Embodiments of the method according to the disclosure for plausibility checking of sensor signals provide at least two separate sensor elements, the sensor signals of which are in each case evaluated by a separate evaluating and control unit.

In an advantageous embodiment of the method for plausibility checking of sensor signals according to the disclosure, the second evaluating and control unit outputs, in dependence on the result of the comparison, the validated sensor data which correspond to the first or the second sensor data, and/or at least one control signal and/or at least one plausibility check signal. In the case of a first result of the comparison which represents an existing plausibility of the first and second sensor data, a positive plausibility check signal is output for further processing to a higher-level process and/or a first control signal which advantageously comprises a confirmation signal and/or an output command is output to the first evaluating and control unit. In the case of a second result of the comparison which represents a lacking plausibility of the first and second sensor data, an output signal identified as implausible is output for further processing to a higher-level process, which signal comprises the first and/or second sensor data and/or a negative plausibility check signal, and/or a second control signal which advantageously comprises a fault signal and/or a reset signal and effects resetting of the first sensor unit and/or a new measurement of the first sensor signals is output to the first evaluating and control unit.

Exemplary embodiments of the disclosure are shown in the drawing and are explained in greater detail in the description following. In the drawing, identical reference symbols designate components or elements which execute the same or analogous functions.

DETAILED DESCRIPTION

Figure 1:
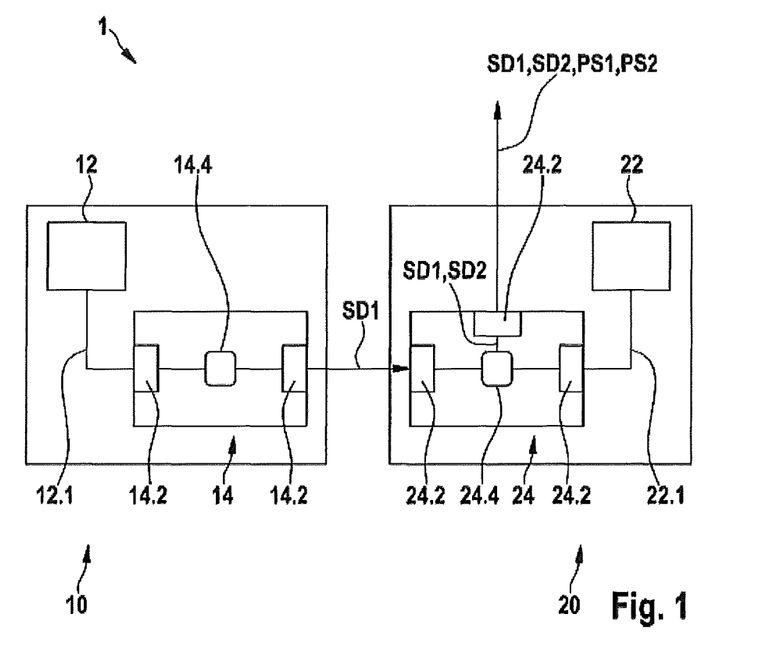
FIG. 1 shows a schematic block diagram of a first exemplary embodiment of a circuit assembly according to the disclosure.

As can be seen from FIG. 1, the first exemplary embodiment shown of a circuit assembly 1 according to the disclosure for plausibility checking of sensor signals 12.1, 22.1 comprises a first and a second sensor unit 10, 20 which in each case have at least one sensor element 12, 22 and one evaluating and control unit 14, 24.

As can also be seen from FIG. 1, a first sensor unit 10 comprises a first sensor element 12 which generates first sensor signals 12.1 and a first evaluating and control unit 14 which has two interface units 14.2 and one computing unit 14.4. A second sensor unit 20 comprises a second evaluating and control unit 24 which has three interface units 24.2 and one computing unit 24.4. The first evaluating and control unit 14 receives the first sensor signals 12.1 of the first sensor element 12 via at least one interface unit 14.2 and evaluates the received first sensor signals 12.1 for generating first sensor data SD1. Furthermore, the first evaluating and control unit 14 provides via the interface units 14.2, 24.2 the generated first sensor data SD1 to a second evaluating and control unit 24 which receives the second sensor signals 22.1 of the second sensor element 22 and evaluates them for generating second sensor data SD2. The second evaluating and control unit 24 compares the second sensor data SD2 generated and the first sensor data SD1 generated directly and/or after processing, especially by a factor, with one another and checks the first and second sensor data SD1, SD2 for plausibility by calculating a difference and/or a quotient. In this context, the first and second sensor data SD1, SD2 are recognized as being plausible when the result of the comparison is within at least one predetermined range, the first and second sensor data SD1, SD2 being recognized as implausible when the result of the comparison is outside the at least one predetermined range. If the first and the second sensor data SD1, SD2 are plausible, the second evaluating and control unit can output validated sensor data SD1, SD2 which correspond to the first and/or the second sensor data SD1, SD2. In addition, a positive plausibility check signal PS1 can be output. The validated sensor data SD1, SD2 and the positive plausibility check signal PS1, respectively, are output preferably for further processing to a higher-level or subsequent process. If the first and the second sensor data SD1, SD2 are not plausible, no output signal or an output signal identified as implausible is output. The identification as implausible can be effected, for example, by the additional output of a negative plausibility check signal PS2. Preferably, the output signal identified as implausible and the negative plausibility check signal PS2, respectively, are also output for further processing to a higher-level or subsequent process.

The sensor units 10, 20 shown can acquire and evaluate equal physical quantities in the same or in different value ranges, or different physical quantities.

Figure 2:
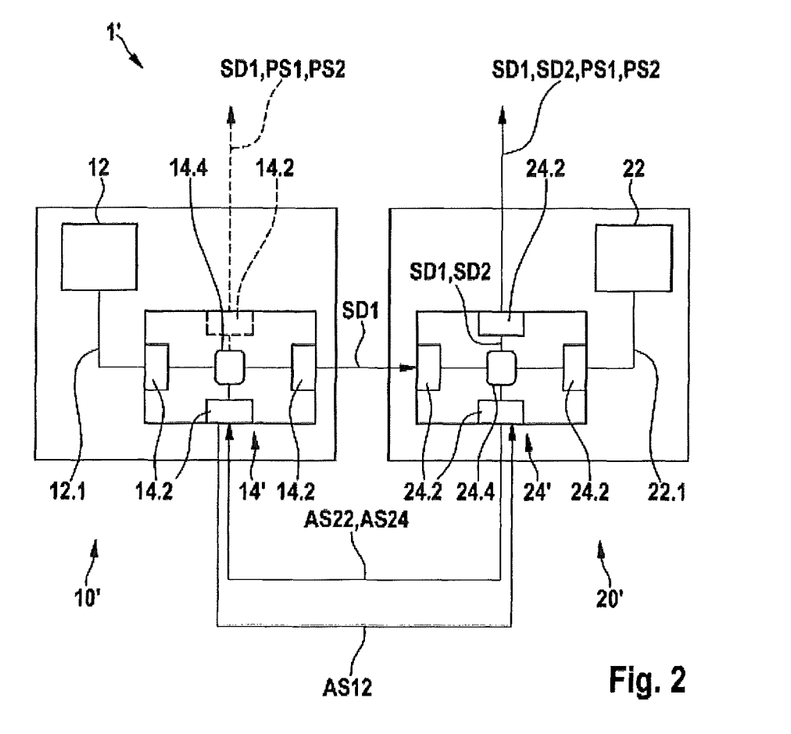
FIG. 2 shows a schematic block diagram of an alternative exemplary embodiment of an extended circuit assembly according to the disclosure.

As can also be seen from FIG. 2, the first exemplary embodiment shown in FIG. 1 can be extended. The second exemplary embodiment shown in FIG. 2 comprises the same components as the first exemplary embodiment shown in FIG. 1. In distinction from the first exemplary embodiment, the first evaluating and control unit 14' has three interface units 14.2 and the second evaluating and control unit 24' has four interface units 24.2.

The extension consists in that in the case of a first result of the comparison, which represents an existing plausibility of the first and second sensor data SD1, SD2, the second evaluating and control unit 24', apart from the validated sensor data SD1, SD2 which correspond to the first or the second sensor data SD1, SD2, can output additionally at least one control signal AS22, AS24. A first control signal AS22 can comprise a confirmation signal and/or an output command and is output to the first evaluating and control unit 14'. Via the confirmation signal, the first sensor unit 10' is advantageously informed that the sensor data SD1 determined are plausible and/or the sensor data SD1, SD2 determined have been output by the second sensor unit 20' and/or the signal processing has proceeded correctly. In the second exemplary embodiment, too, a positive plausibility check signal PS1 can be output additionally. The validated sensor data SD1, SD2 and the positive plausibility check signal PS1, respectively, are preferably output for further processing to a higher-level or subsequent process. For example, the first control signal AS22 can also be output as positive plausibility check signal PS1 to the higher-level or subsequent process.

In the case of a second result of the comparison which represents a lacking plausibility of the first and second sensor data SD1, SD2, a second control signal AS24 output by the second evaluating and control unit 24' can comprise a fault signal and/or a reset signal which is output to the first evaluating and control unit 14' and which can result in resetting of the first sensor unit 10' and/or a new measurement of the first sensor signals 12.1. By means of such a reset process of the first sensor unit 10', the first evaluating and control unit 14', designed, for example, as microprocessor, and the first sensor element 12 can be reset into a starting condition and/or the first sensor data SD1 stored in registers or memories can be deleted and/or a program or process sequence reset to a starting step. In the second exemplary embodiment, too, an output signal identified as implausible can be output, the identification as implausible being effectable, for example, by the additional output of a negative plausibility check signal PS2. The output signal identified as implausible and the negative plausibility check signal PS2, respectively, are output preferably to a higher-level or subsequent process for further processing. As a negative plausibility check signal PS1, the second control signal AS24 can also be output to the higher-level or subsequent process, for example.

Furthermore, the first evaluating and control unit 14' can output a control signal AS12 to the second evaluating and control unit 24' in response to the second control signal AS24 or to the lack of the first control signal AS22, which control signal AS12 can result in resetting of the second sensor unit 20' and/or new measurement of the second sensor signals 22.1. By means of such a reset process of the second sensor unit 20', the second evaluating and control unit 24', designed for example as a microprocessor, and the second sensor element 22 can be reset into an initial state and/or the second sensor data SD2 stored in registers or memories deleted and/or a program or a process sequence reset to a starting step.

On the basis of the output command, the first evaluating and control unit 14' can output the first sensor data SD1 as validated sensor data SD1 and/or the positive plausibility check signal PS1 via a further interface unit 14.2 shown by a dashed line. The output of the first sensor data SD1 as validated sensor data SD1 by the first sensor unit 10' can take place in addition or as an alternative to the output of the validated sensor data SD1, SD2 of the second sensor unit 20'. Thus, the second evaluating and control unit 24' can convey only the output command without even outputting the first or second sensor data SD1, SD2 as validated sensor data SD1, SD2. The same applies to the output of the output signal identified as implausible or the negative plausibility check signal PS2, respectively.

Figure 3:
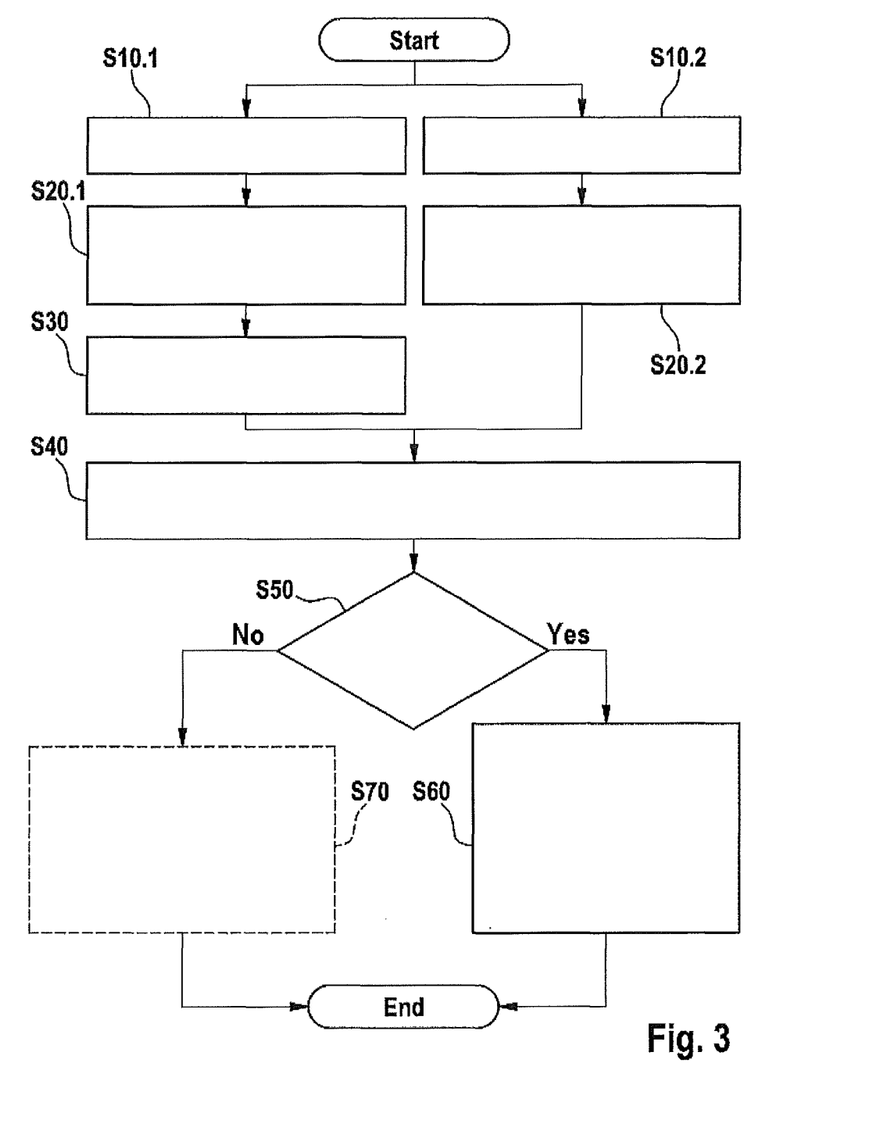
FIG. 3 shows a schematic block diagram of an exemplary embodiment of a method according to the disclosure for plausibility checking of sensor signals.
Figure 4:
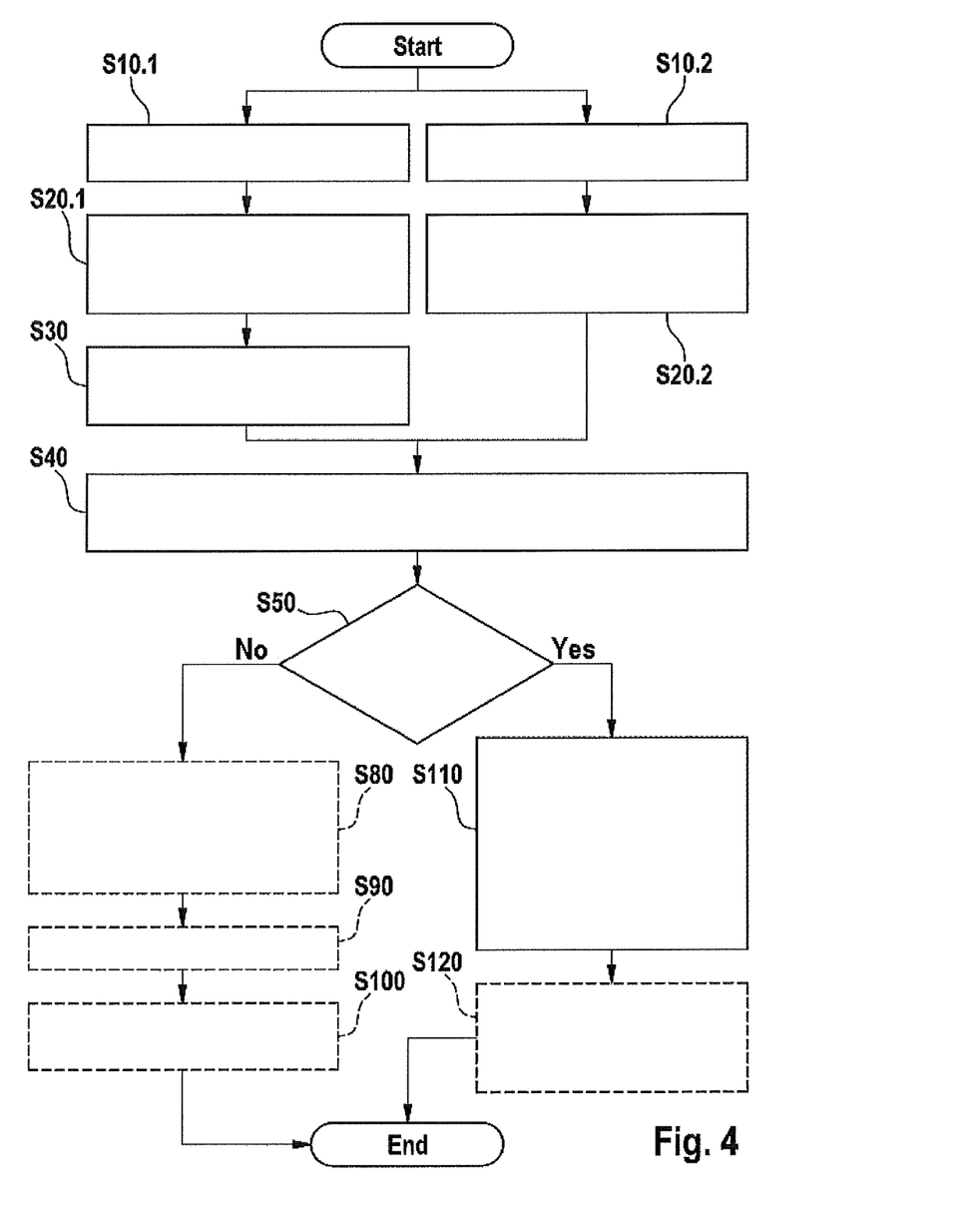
FIG. 4 shows a schematic block diagram of an alternative exemplary embodiment of a method according to the disclosure for plausibility checking of the sensor signals.

As can be seen from FIGS. 3 and 4, embodiments of the method according to the disclosure for plausibility checking of sensor signals 12.1, 22.1 comprise, especially for safety-related sensor signals, the separate evaluation of sensor signals 12.1, 22.1 which are acquired by at least two separate sensor elements 12, 22, by in each case at least one evaluating and control unit 14, 14', 24, 24' which converts the respective sensor signals 12.1, 22.1 into corresponding sensor data SD1, SD2.

In a method step S10.1, first sensor signals 12.1 are acquired by a first sensor element 12. In a method step S10.2, second sensor signals 22.1 are acquired by a second sensor element 22.

According to the disclosure, the first sensor signals 12.1 of the first sensor element 12 are evaluated by a first evaluating and control unit 14, 14' during method step S20.1 and converted into first sensor data SD1. Furthermore, the second sensor signals 22.1 of the second sensor element 22 are evaluated by a second evaluating and control unit 24, 24' in method step S20.2 and converted into second sensor data SD2.

In method step S30, the first sensor data SD1 are transmitted to the second evaluating and control unit 24, 24'. In method step S40, the generated first sensor data SD1 and the generated second sensor data SD2 are compared with one another by the second evaluating and control unit 24, 24' and checked for plausibility. The plausibility check calculation in step S50 is effected advantageously directly with the first and second sensor data SD1, SD2 and/or after processing of the first and second sensor data SD1, SD2, especially by a factor, by means of calculation of a difference and/or of a quotient. The first and second sensor data SD1, SD2 are recognized as plausible if the result of the comparison is within at least a predetermined range. The first and second sensor data SD1, SD2 are recognized as implausible if the result of the comparison is outside the at least one predetermined range.

In the exemplary embodiment shown in FIG. 3, at least one output signal is output in method step S60 when the first and second sensor data SD1, SD2 are plausible. This output signal can be output by the first and/or by the second evaluating and control unit 14, 14', 24, 24' and comprises especially the first or second sensor data SD1, SD2 as validated sensor data SD1, SD2 and/or the positive plausibility check signal PS1. The output signal can also comprise an output command or a confirmation signal AS22 to the other evaluating and control unit 14', 24'. If the first and second sensor data SD1, SD2 are not plausible, the method is terminated and no output signal is output. As an alternative, an output signal identified as implausible can be output in an optional step S70, shown by a dashed line, which signal comprises the first and/or second sensor data. The identification as implausible can be effected, for example, by the additional output of the negative plausibility check signal PS2.

The exemplary embodiment shown in FIG. 4 comprises steps S10 to S50 from FIG. 3 and is extended by steps S80 to S120. In the case of the lacking plausibility, detected in step S50, of the first and second sensor data SD1, SD2, no output signal can be output. As an alternative, an output signal recognized as implausible can be output in the optional method step S80, shown by a dashed line, which signal comprises the first and/or second sensor data and/or the negative plausibility check signal PS2. In addition or as an alternative, the second control signal AS24 can be output in the optional method step S90, shown by a dashed line, by the second evaluating and control unit 24' to the first evaluating and control unit 14', which may effect resetting of the first sensor unit 10' and/or a new measurement of the first sensor signals 12.1. Similarly, an output of the third control signal AS12 from the first evaluating and control unit 14' to the second evaluating and control unit 24' is possible, which may effect resetting of the second sensor unit 20' and/or a new measurement of the second sensor signals 22.1. The third control signal AS12 can be sent out when the first evaluating and control unit 14' receives the second control signal AS24 from the second evaluating and control unit 24' and/or when the first control signal AS22 from the second evaluating and control unit 24' fails to appear. Additionally or as an alternative, at least one sensor unit 10', 20' can be reset on the basis of the error signals in method step S90 in the optional method step S100, shown by a dashed line.

In the case of an existing plausibility of the first and second sensor data SD1, SD2, the first and/or second sensor data SD1, SD2 are output as validated sensor data SD1, SD2 and/or the positive plausibility check signal PS1 by at least one evaluating and control unit 14', 24' in method step S110. Furthermore, the first control signal AS22 can be output by the second evaluating and control unit 24' to the first evaluating and control unit 14' in the optional method step S120, shown by a dashed line. Via the first control signal, the first sensor unit 10' is advantageously informed that the sensor data SD1, SD2 determined are plausible and/or the sensor data SD1, SD2 determined have been output by the second sensor unit 20' and/or the signal processing has taken place correctly.

In the exemplary embodiments shown, two sensor units are shown. However, embodiments having a number of sensor units are conceivable wherein, according to the disclosure, the sensor signals from sensor elements of a sensor unit are in each case evaluated by the sensor unit's own evaluating and control unit, and wherein one of the evaluating and control units arranged in the sensor units performs the plausibility check.

Embodiments of the present disclosure are especially suitable for the plausibility checking of safety-related sensor signals in a safety system such as, for example, a passenger protection system, a pedestrian protection system etc.

The invention claimed is:

1. A circuit assembly for plausibility checking of sensor signals comprising:
   a first sensor element;
   a second sensor element;
   a first evaluating and control unit;
   a second evaluating and control unit;
   wherein the first evaluating and control unit is operatively connected to the second evaluating and control unit, the first sensor element, and not to the second sensor element, the first evaluating and control unit being configured to:
      receive first sensor signals from the first sensor element;
      evaluate the first sensor signals to generate first sensor data; and
      provide the generated first sensor data via a first interface unit to the second evaluating and control unit; and
   wherein the second evaluating and control unit is operatively connected to the first evaluating and control unit, the second sensor element, and not to the first sensor element, the second evaluating and control unit being configured to:
      receive second sensor signals from the second sensor element;
      evaluate the second sensor signals to generate second sensor data;
      perform a plausibility check based on the first sensor data received from the first evaluating and control unit and the second sensor data; and
      generate an output including at least one of the first sensor data, the second sensor data, the second sensor data, a control signal, and a signal indicating a successful plausibility check only in response to a positive result of the plausibility check.

2. The circuit assembly as claimed in claim 1, the second evaluating and control unit being further configured to:
generate a reset signal for the first evaluating control unit to reset the first sensor element in response to a failure of the plausibility check; and
receive third sensor data from the first evaluating control unit after the reset of the first sensor element.

3. The circuit assembly as claimed in claim 1 the second evaluating and control unit being further configured to:
generate a plausibility check result based at least in part on one of a difference and a ratio between the first sensor data and the second sensor data; and
identify that the first sensor data and the second sensor data are plausible during the plausibility check in response to the plausibility check result being within a predetermined range.

4. The circuit assembly as claimed in claim 1, wherein:
the first sensor signal represents an acceleration in a low-G range, and
the second sensor signal represents an acceleration in a high-G range.

5. A method for plausibility checking of sensor signals, comprising:
acquiring sensor signals with at least two separate sensor elements;
evaluating the acquired sensor signals with at least one evaluating and control unit; and
converting the evaluated sensor signals into sensor data,
wherein first sensor signals of a first sensor element of the at least two separate sensor elements are (i) evaluated by a first evaluating and control unit of the at least one evaluating and control unit, (ii) converted into first sensor data, and (iii) transmitted to a second evaluating and control unit of the at least one evaluating and control unit,
wherein the second evaluating and control unit is configured (i) to evaluate second sensor signals of a second sensor element of the at least two separate sensor elements, and (ii) to convert the second sensor signals into second sensor data, (iii) to compare the generated first sensor data and the generated second sensor data with one another, (iv) to check the generated first sensor data and the generated second sensor data for plausibility; (v) to generate a reset signal to reset the first evaluating and control unit in response to a lack of plausibility in the check for plausibility; and (vi) to receive a new measurement of the first sensor signal after generation of the reset signal.

* * * * *